US008284787B2

(12) United States Patent
Sahni et al.

(10) Patent No.: US 8,284,787 B2
(45) Date of Patent: Oct. 9, 2012

(54) DYNAMIC TREE BITMAP FOR IP LOOKUP AND UPDATE

(75) Inventors: Sartaj Kumar Sahni, Gainesville, FL (US); Haibin Lu, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 700 days.

(21) Appl. No.: 12/307,064

(22) PCT Filed: Jul. 20, 2007

(86) PCT No.: PCT/US2007/073958
§ 371 (c)(1),
(2), (4) Date: Sep. 9, 2009

(87) PCT Pub. No.: WO2008/014188
PCT Pub. Date: Jan. 31, 2008

(65) Prior Publication Data
US 2009/0327316 A1    Dec. 31, 2009

Related U.S. Application Data

(60) Provisional application No. 60/833,721, filed on Jul. 27, 2006.

(51) Int. Cl.
*H04L 12/28* (2006.01)
*H04L 12/56* (2006.01)
(52) U.S. Cl. .................................... 370/408; 370/256

(58) Field of Classification Search .......... 370/255–258, 370/407–408, 392, 400, 351, 389, 401; 707/102, 707/103, 104.1, 999.101, 999.102, 999.103, 707/999.104, 999.105, 999.106, 999.107
See application file for complete search history.

(56) References Cited

U.S. PATENT DOCUMENTS

| | | | |
|---|---|---|---|
| 6,560,610 B1 * | 5/2003 | Eatherton et al. ...................... 1/1 |
| 7,007,123 B2 * | 2/2006 | Golla et al. .................... 710/243 |
| 7,031,320 B2 | 4/2006 | Choe et al. |
| 7,899,067 B2 * | 3/2011 | Rangarajan et al. .......... 370/408 |
| 7,930,559 B1 * | 4/2011 | Beaverson et al. ............ 713/193 |
| 2003/0026246 A1 * | 2/2003 | Huang et al. .................. 370/352 |
| 2004/0008634 A1 | 1/2004 | Rangarajan et al. |
| 2005/0157712 A1 | 7/2005 | Rangarajan et al. |

OTHER PUBLICATIONS

Sundström, M. and Larzon, L.-A., "High-Performance Longest Prefix Matching Supporting High-Speed Incremental Updates and Guaranteed Compression," IEEE Computer and Communications Societies (INFOCOM), 2005, vol. 3, pp. 1641-1652. US.
Eatherton, W., Varghese, G. and Dittia, Z., "Tree Bitmap: Hardware/Software IP Lookups with Incremental Updates," ACM SIGCOMM Computer Communication Review, vol. 34, No. 2, pp. 97-122, Apr. 2004.
Antos, D., "Overview of Data Structures in IP Lookups," CESNET Technical Report, Sep. 19, 2002.

* cited by examiner

*Primary Examiner* — Chuong T Ho
(74) *Attorney, Agent, or Firm* — Saliwanchik, Lloyd & Eisenschenk

(57) ABSTRACT

The subject invention provides a data structure and method for IP lookups, insertions, and deletions using a dynamic tree bitmap structure (DTBM) that utilizes an array of child pointers for each node instead of the typical TBM approach using one pointer to an array of children.

14 Claims, 6 Drawing Sheets

R = {*, 0.1*, 1*}

Prefix bitmap: 1010100

Algorithm *llmp(d)*{
   $i = 2^h + d.bits(h)$;
   *length* = *h*;
   while ($i > 0$ and ($IBM(i) == 0$))
     {$i/ = 2$; *length* − −;}
   return *length*;
}

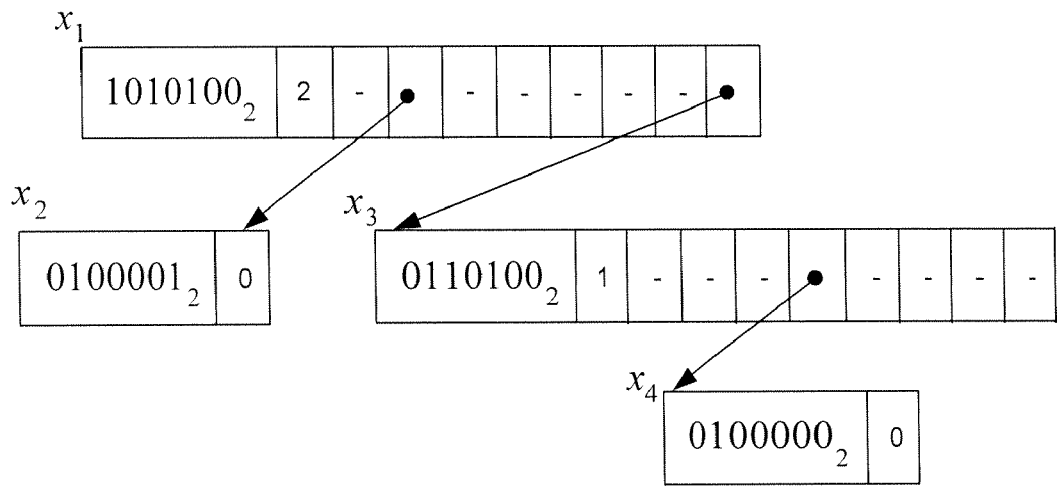
FIG. 4
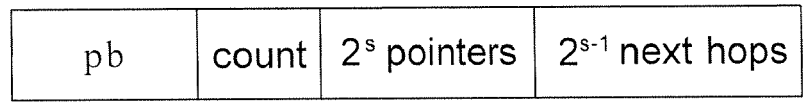
FIG. 5
Algorithm *lookup(d)*{// assume there is a matching prefix
   *node = root*;
   do{
      *t = node.IBM.llmp(d)*;
      if ($t \geq 0$) // there is a matching prefix in current node
         {*y = node*; *hopIndex* = $2^t$ + *d.bits(t)*;}
      *node = node.pointers[d.bits(s)]*;
      shift *d* left by *s* bits;
   } while(*node ≠ null*);
   return *y.nextHop[hopIndex]*;
}
FIG. 6

Algorithm *insert(p){*
01    if (*root* is *null*) *root* = new DTBMNode;
02    *node* = *root*;
03    while (*p.length* ≥ *s* and *node.pointers*[*p.bits(s)*] ≠ *null*) {
04       *node* = *node.pointers*[*p.bits(s)*];
05       shift *p* left by *s* bits;
06    }
07    if (*p.length* ≥ *s*){
08       *node.count* + +;
09       do {
10         *node* = *node.pointers*[*pbits(s)*] = new DTBMNode;
11         *node.count* = 1;
12         shift *p* left by *s* bits;
13       } until (*p.length* < *s*)
14    }
15    Insert *p* into *node*;
}

FIG. 7

Algorithm *delete(p)*{
```
01    node = root; i = −1; x = null;
02    while (p.length ≥ s and node ≠ null) {
03        if (node.count = = 1 and node.IBM = = 0)
04            {nodes[+ + i] = node; nodes[+ + i] = p.bits(s);}
05        else {i = −1; x = node; xBits = p.bits(s);}
06        node = node.pointers[p.bits(s)];
07        shift p left by s bits;
08    }
09    if (node ≠ null and p is in node){
10        delete p from node;
11        if(node.count = = 0 and node.IBM = = 0)
12            deleteCleanup(node, nodes, i, x, xBits)
13    }
}
```

FIG. 8

Algorithm *deleteCleanup(node, nodes, i, x, xBits)*{
```
01    delete node;
02    while (i ≥ 0){
03        nodes[i − 1].pointers[nodes[i]] = null;
04        nodes[i − 1].count = 0;
05        delete nodes[i − 1];
06        i− = 2;
07    }
08    if (x ≠ null){
09        x.pointers[xBits] = null;
10        x.count − −;
11    }
12    else root = null;
}
```

FIG. 9

Algorithm *lazyInsert* (p){
01    if (*root* is *null*) *root* = new DTBMNode;
02    *node* = *root*;
03    while (*p.length* ≥ *s* and *node.pointers*[*p.bits(s)*] ≠ *null*) {
04        *node* = *node.pointers*[*p.bits(s)*];
05        shift *p* left by *s* bits;
06    }
07    if (*p.length* ≥ *s*){
08        do {
09            *node* = *node.pointers*[*pbits(s)*] = new DTBMNode;
10            shift *p* left by *s* bits;
11        } until (*p.length* < *s*)
12    }
13    Insert *p* into *node*;
}

FIG. 10

Algorithm *lazyDelete*(p){
01    *node* = *root*;
02    while (*p.length* ≥ *s* and *node* ≠ *null*) {
03        *node* = *node.pointers*[*p.bits(s)*];
04        shift *p* left by *s* bits;
05    }
06    if (*node* ≠ *null* and *p* is in *node*)
07        delete *p* from *node*;
}

FIG. 11

DYNAMIC TREE BITMAP FOR IP LOOKUP AND UPDATE

CROSS-REFERENCE TO A RELATED APPLICATION

This application is a National Stage Application of International Application Number PCT/US2007/073958, filed Jul. 20, 2007; which claims the benefit of U.S. provisional application Ser. No. 60/833,721, filed Jul. 27, 2006, and are incorporated herein by reference in their entirety.

GOVERNMENT SUPPORT

This invention was made with government support under a grant awarded from the National Science Foundation under Grant No. ITR-0326155. The government has certain rights in the invention.

FIELD OF THE INVENTION

The present invention generally relates to IP based data networks, communications and computer systems; more specifically, to a method and system for the representation of dynamic IP router tables through a dynamic tree bitmap (DTBM).

BACKGROUND OF THE INVENTION

As higher bandwidth is offered by optical networks, more efficient methods are needed to perform IP lookup and packet classifications in high performance internet routers. In general, a router is connected to several different networks and typically classifies incoming packets into flows utilizing information contained in packet headers and a table of classification rules. This table is called the "router table" (equivalently, rule table). When a computer communicates with another on the Internet, IP data packets are directed from source to destination through a series of routers which read the destination address and re-transmit the packet either to its destination as indicated by the destination address, or to another router which will forward the packet further along until the packet reaches its destination. Each of these intermediate steps between router and destination are referred to as a "next hop."

The combination of output interface and next hop is referred to as the "route". Since there is typically more than one route that will ultimately lead a packet to its destination, prior to routing the data packet, the router must learn the set of addresses to which the packet may be forwarded. Typically the appropriate route for a given IP address is encoded in part or all of the IP address itself. The next step for the router is to find a route that corresponds to any of the addresses within this set of addresses. It should be apparent that since there are a range of addresses the router may find more than one route that matches an address for this packet. The router's task is to find the best route, defined by the address that has the most bits in common with the packet's destination address.

Packet classification is generally done using the destination address of a packet. Each router-table rule is a pair of the form (F, NH), where F is a filter and NH is a next hop. A filter is a destination-address prefix that matches all destination addresses for which it is a prefix. The associated rule tables are known as LMPTs and W is used to denote the maximum possible length of a prefix. For example, the filter 10* matches all destination addresses that begin with the bit sequence 10. Through the use of a routing look-up table, the router must determine the output interface port, through which to forward the packet and the next hop for that packet from the node connected to that interface.

Generally, the length of a router-table prefix cannot exceed the length W of a destination address. For Internet Protocol Version 4 (IPv4), the forwarding decision is based on a 32-bit destination address carried in each packet's header and W is considered to be 32 bits. A lookup engine at each port of the router uses a suitable routing data structure to determine the appropriate outgoing link for the packet's destination address. Similarly, for Internet Protocol Version 6 (IPv6), the forwarding decision is based on a 128-bit destination address carried in each packet's header and W is considered to be 128 bits.

Traditionally, a router look-up operation is performed in linear fashion. Each entry in a look-up table is examined for a match. The operation must continue throughout the table even after a match is found to be certain that the best match was found. Since an Internet router-table may contain several rules that match a given destination address d, a tie breaker is used to select a rule from the set of rules that match the destination address. Generally, ties are broken by selecting the next hop associated with the longest prefix that matches the packet's destination address via longest-prefix matching.

Data structures for longest-prefix matching have been intensely researched in recent years. Ternary content-addressible memories (TCAMs) use parallelism to achieve O(1) lookup. Each memory cell of a TCAM may be set to one of three states "0", "1", and "?" (don't care). The prefixes of a router table are stored in a TCAM in descending order of prefix length. Assuming that each word of the TCAM has 32 cells, the prefix 10* is stored in a TCAM word as 10??? . . . ?, where ? denotes a don't care and there are 30 ?s in the given sequence. To do a longest-prefix match, the destination address is matched, in parallel, against every TCAM entry and the first (i.e., longest) matching entry reported by the TCAM arbitration logic. Thus, using a TCAM and a sorted-by-length linear list, the longest matching-prefix can be determined in O(1) time. A prefix may be inserted or deleted in O(q) time, where q is the number of different prefix lengths in the table. Although TCAMs provide a simple and efficient solution for static and dynamic router tables, this solution requires specialized hardware, costs more, and uses more power and board space than other current solutions.

Among the vast array of solutions to the problem, few achieve a favorable balance of performance, efficiency, and cost. Dynamic IP router tables have been known in the art and several data structures have been proposed for dynamic LMPTs. (See U.S. Pat. No. 7,031,320 (hereinafter the '320 patent)). In particular, the '320 patent teaches using a skip list for the routing table where lookup, insertions, deletions and updates must be started from the header node (col. 8, lines 22-26). Each node has a single pointer or multiple pointers and the leftmost node is called a header node. In addition, each prefix length has its own hash table to store route entries matching to the corresponding prefix length. Each hash table only stores route entries exactly matching its prefix length (col. 9, lines 17-27). Each node has route entries ranging from 32 to 24 and if route entries exist corresponding to each prefix length ranging from 32 to 24, inclusive, then the corresponding node will have nine (9) pointers to point to nine (9) different hash tables. Although these structures may improve insert/delete complexity, the improvement is at the expense of lookup complexity.

A tree bitmap (TBM) data structure for dynamic LMPTs has been previously proposed by Eatherton et al. in "Tree bitmap: hardware/software IP lookups with incremental updates". SIGCOMM Comput. Commun. Rev., 34(2):97-122, 2004, to improve lookup complexity. (See also U.S. Pat. App. No. 2005/0157712). Although this data structure results in fast lookups, inserts and deletes make an excessive number of memory accesses. The reasons for the poor performance of TBM on insert and delete operations stem from the fact that, in a TBM, the children of a node are stored in contiguous memory using variable-size memory blocks. This has two detrimental consequences for insert and delete operations. First, a complex memory management system is needed to allocate and deallocate variable size memory blocks. Second, insertion or deletion of a prefix may significantly change the number of children that a node has, causing poor performance. This requires the deallocation of an old memory block and allocation of a new memory block. Consequently, insertion and deletion may require more than 3000 memory accesses each, in the worst case.

Hardware solutions that involve the use of content addressable memory as well as solutions that involve modifications to the Internet Protocol (i.e., the addition of information to each packet) have also been proposed to increase the efficiency of routing packets. Unfortunately, specialized hardware solutions are expensive and are difficult to efficiently individualize to specific needs.

Accordingly, there exists a need for a data structure and method that provides very high lookup and update rates without sacrificing one for the other, that achieves a favorable balance of performance, efficiency, and cost.

BRIEF SUMMARY OF THE INVENTION

The subject invention provides methods and systems for the representation of dynamic IP router tables through a dynamic tree bitmap (DTBM) that supports very high lookup and update rates. By enabling high speed route lookup and update operations, the router as a performance bottleneck is reduced and in some cases eliminated.

As contemplated by the present invention, a dynamic routing table is constructed by using a new type of data structure called dynamic tree bitmap (DTBM) that uses an array of child pointers for each node instead of the traditional storage in contiguous memory.

As an efficient alternative to a tree bitmap (TBM), in the novel DTBM, each node has an array of child pointers. This change greatly simplifies memory management and results in much faster inserts and deletes while not having to sacrifice lookup speed. The required additional memory of the subject invention is well within the capacity of commercially available SRAMs.

Accordingly, the features of the present invention include embodiments directed to a data structure incorporating a next hop array, an array of child pointers, a count of the number of non-null children for each node, memory management using a single chain of free nodes, memory management using a packed mode where several leaves (the outermost child nodes with no subsequent children of their own) are packed into a single 28-word node (alternatively 12-word nodes, and/or 8-word nodes), or a lazy mode operation where prefix deletion is performed by setting a bit of a node to 0 and not deallocating the node. In addition, the methods of inserting and deleting prefixes using the dynamic tree bitmap are included in the present invention.

The advantages of the invention are numerous. One significant advantage of the invention is that it provides a data structure that allows simple memory management and better system resource allocation by achieving very high lookup and update rates. Other aspects and advantages of the invention will become apparent from the following detailed description taken in conjunction with the accompanying drawings, illustrating, by way of example, the principles of the invention.

BRIEF DESCRIPTION OF THE DRAWINGS

FIG. 4 is a pictorial representation of the dynamic tree bitmap (DTBM) structure.
FIG. 5 is a pictorial representation of the general format for a DTBM node.
FIG. 6 is the lookup algorithm for a DTBM.
FIG. 7 is the algorithm to insert a prefix p into a DTBM whose stride is s.
FIG. 8 is the algorithm to delete a prefix p from a DTBM.
FIG. 9 is the cleanup algorithm used by delete(p).
FIG. 10 is the algorithm for prefix insertion for lazy mode.
FIG. 11 is the algorithm for prefix deletion for lazy mode.

It should be understood that in certain situations for reasons of computational efficiency or ease of maintenance, the ordering and relationships of the blocks of the illustrated flow charts could be rearranged or re-associated by one skilled in the art.

DETAILED DISCLOSURE OF THE INVENTION

The present invention relates to methods for improving router operations and use of a data structure that allows simple memory management and better system resource allocation by achieving very high lookup and update rates. The structure is able to support very high update rates without having to sacrifice lookup speed. The subject invention is directed to the data structure and method for IP lookups, insertions, and deletions using a dynamic tree bitmap structure (DTBM) that utilizes an array of child pointers for each node instead of the typical TBM approach using one pointer to an array of children.

Figure 1A:
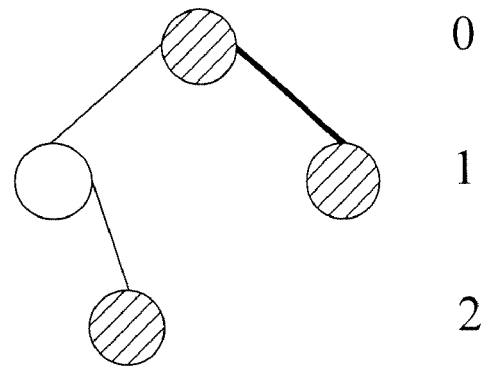
FIG. 1A is a one-bit trie representation of the prefix set R.
Figure 1B:
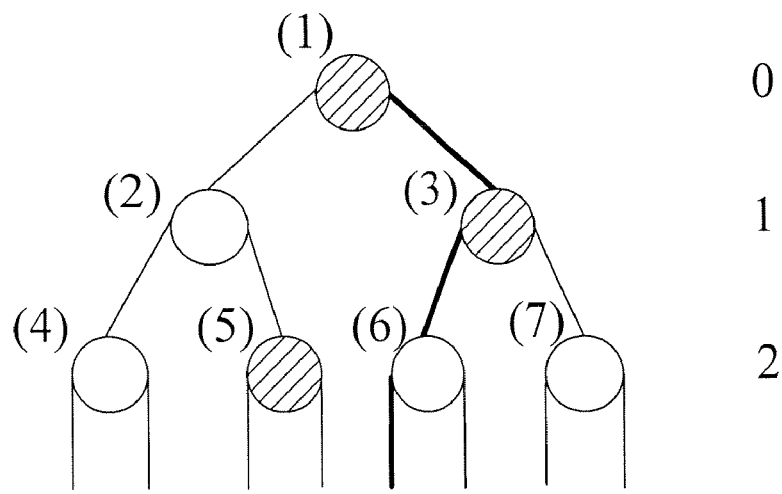
FIG. 1B is a full trie whose height is 2.

In one embodiment of the invention, for any node x in the one-bit trie, the prefix(x) is an encoding of the path from the root to x. FIG. 1(a) shows the one-bit trie representation of the prefix set R={*, 01*, 1*}. Left branches add a 0 to the encoding and right branches add a 1. The encoding always ends in a *. For example, prefix(root)=*, prefix(root.left)=0*, prefix(root.right)=1*, and prefix(root.left.left)=00*. A node x is shaded if and only if prefix(x) is an element of the set R. If the one-bit trie of FIG. 1(a) is extended to a full trie whose height is 2 (FIG. 1(b)) this full trie may be compactly represented using a prefix bitmap (also known as the internal bitmap (IBM)) that is obtained by placing a 1 in every shaded node and a 0 in every non-shaded node and then listing the node bits in level order. For the full trie of FIG. 1(b), this level order traversal results in the IBM 1010100.

In another embodiment, the IBM of a full one-bit trie of height h has exactly $2^{h+1}-1$ bits, one bit for each node in the trie. If the bits of the IBM are numbered in level order beginning at 1, then a walk through the corresponding full trie can be simulated by using the formulae: left child of i is 2i, right child is 2i+1 and parent is i/2 (S. Sahni, "Data structures, algorithms, and applications in Java", McGraw Hill, N.Y., 2000, pg. 833). To obtain the next hop for the longest matching prefix, the IBM is supplemented with a next hop array called nextHop, that stores the next hops contained in the nodes of the full trie. For a full trie whose height is h, the size of the next hop array is $2^{h+1}-1$. For the example trie, the nextHop array has seven entries, four of which are null.

In one embodiment of the present invention, the next hop associated with the longest matching prefix is found by simulating a top-to-bottom walk beginning at the trie root and using the bits in the destination address. The simulated walk moves through the bits of the IBM keeping track of the last 1 that is seen. If the last 1 was in position i of the IBM, the next hop is retrieved from position i of the nextHop array.

In another embodiment, an alternative strategy is to start from the appropriate leaf of the trie and move up toward the root stopping at the first 1 that is encountered in the IBM. If d.bits(j) is the integer represented by the first j bits of the destination address d, then d.bits(0)=0 for all d and that for d=$101_2$, d.bits(1)=$1_2$=1, d.bits(2)=$10_2$=2, and d.bits(3)=$101_2$=5. In case d has fewer than j bits, then d.bits(j) is obtained by first appending enough 0s to d so that the new d has j bits.

In another embodiment, for a full trie whose height is h, a top-down search terminates at the leaf whose index is $2^h$+d.bits(h). For example, when d=$101_2$ and h=2, the search terminates at the leaf labelled $2^2$+2=6 in FIG. 1(b).

Figures 2, 3:
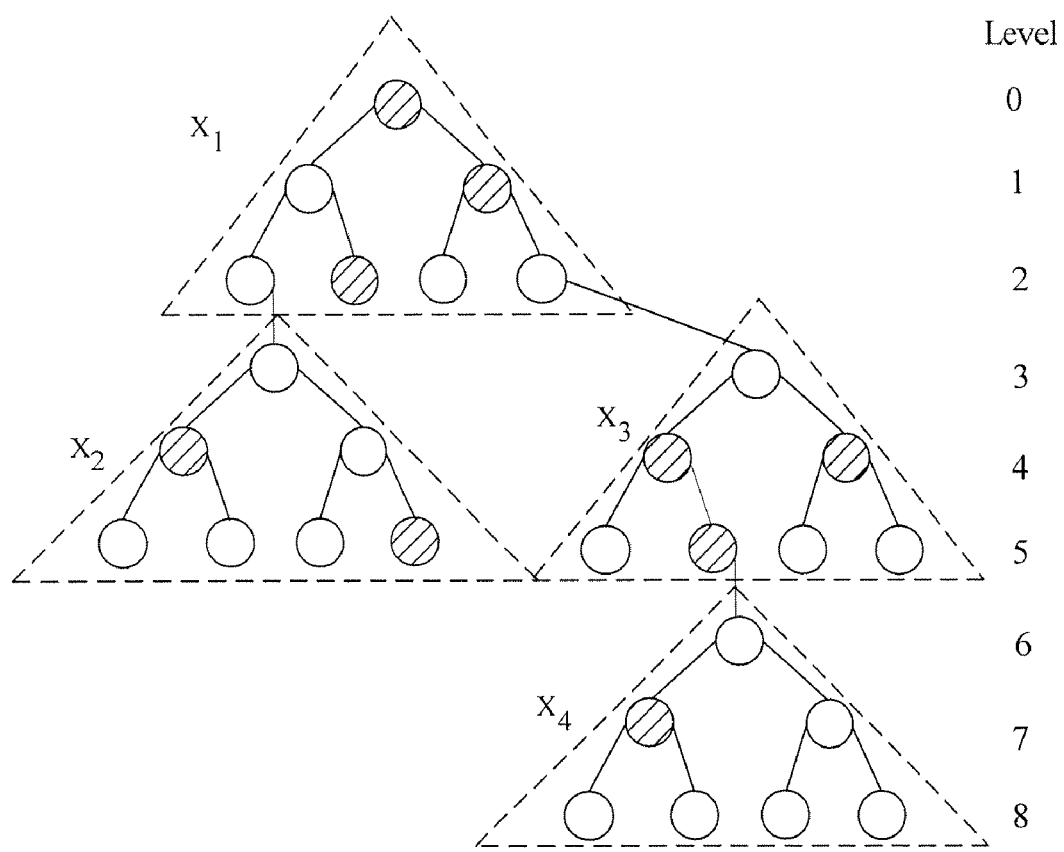
FIG. 2 is the algorithm to find the length of the longest matching prefix for d.
FIG. 3 is a stride-3 (SFE) full extension of the one-bit trie.

In yet another embodiment, traversal may start a bit $2^h$+d.bits(h) of the IBM and a walk up the trie may be simulated by dividing the current bit index by 2 for each move to a parent. The simulated walk terminates when a bit whose value is 1 is reached or when the bit index becomes 0. FIG. 2 gives the algorithm that uses this alternative strategy to find the length of the longest matching prefix for d. IBM(i) returns the $i^{th}$ bit of the IBM (note that bits are numbered beginning at 1).

In another embodiment, a stride s is picked and the stride s full extension (SFE) of the one-bit trie is constructed. The SFE is obtained by partitioning the one-bit trie into subtries whose height is s−1, beginning at the root. Partitions that have no descendants may have a height smaller than s−1. Each partition is then expanded to a full trie whose height is s−1. FIG. 3 shows an example stride-3 SFE. In partition $x_4$, the root and its left child are also in the original one-bit trie for the prefix set. The remaining 4 nodes are added to complete the partition into a full trie whose height is 2.

In another embodiment, each partition of a stride-s SFE is represented by a $2^s-1$ bit IBM, a nextHop array whose size is $2^s-1$, an array of child pointers, and a count of the number of this partition's non-null children. The array of child pointers can accommodate $2^s$ pointers to children partitions. FIG. 4 shows the representation for the stride-3 SFE of FIG. 3. Each node of this figure represents a stride-3 partition. The first field of each node is its IBM, the second is the count of children, and the next $2^s$ fields are the children pointers. Hence, FIG. 4 defines the dynamic treebitmap (DTBM) structure. FIG. 5 shows the general format for a DTBM node.

Definition of Terms

The term "child" or "children" as used herein, refers to the subsequent node(s) any given node points to.

The term "node" as used herein, refers to an entry into a tree structure.

The term "filter" as used herein, refers to an IP address prefix.

The term "parent" refers to the node that points to any given node or child.

The term "root," as used herein, refers to the top node of a tree structure and the term "leaf," refers to a node with no children.

The term "stride" as used herein, refers to the number of tree levels of the binary trie that are grouped together or as the number of levels in a tree accessed in a single read operation representing multiple levels in a tree or trie.

The term "trie," as used herein, refers to a special tree structure organized for searching data.

Lookup Algorithm

FIG. 6 gives the lookup algorithm for a DTBM. The node.pointers[i] position returns the $i^{th}$ child pointer and nextHop[i] position returns the $i^{th}$ entry in the nextHop array of the current DTBM node. Child indexes start at 0 and next hop indexes at 1.

For example, when searching the DTBM, as seen in FIG. 4, using d=$1110111_2$, the partition represented by node $x_1$ is searched using the first 2 bits (11) of d. So, $x_1$.IBM.llmp(d) returns 1 and y is set to $x_1$ and hopIndex to $2^1$+1=3. Since d.bits(s)=d.bits(3)=7, node is updated to $x_3$. Also, d is shifted left by s=3 bits and becomes $0111_2$. Next, the partition represented by $x_3$ is searched using the first 2 bits(01) of the updated d and $x_3$.IBM.llmp(d) returns 2. So, y is updated to $x_3$ and hopIndex to 5. This time, d.bits(3)=3 and node is updated to $x_4$. Following a left shift by 3 bits, d becomes $1_2$. In order to search for $x_4$, a 0 must be appended to d to obtain $10_2$. Next the IBM of $x_4$ may be searched beginning at position $2^2$+2=6. This search returns −1 and node is updated to null. Now by exiting the do loop, the nextHop[5] value of $x_3$ is returned.

Inserting a Prefix

FIG. 7 gives the algorithm to insert a prefix p into a DTBM whose stride is s. In the while loop of lines 3 through 6, walking down the DTBM one node at a time consumes s bits of p. This walk terminates when either p has fewer than s bits left or the next DTBM node to move to doesn't exist. In the latter case, we continue to sample p s-bits at a time adding nodes to the DTBM until fewer than s bits are left in p. The remaining bits (less than s) of p are used to insert p into the last node Z encountered. If p has no remaining bits, the leftmost IBM bit of Z is set to 1 and Z.nextHop[1] is set to the next hop for p. Otherwise, bit $2^{p.length}$+p.bits(p.length) of the IBM of Z is set to 1 and the corresponding nextHop entry set to the next hop for p.

Deleting a Prefix

FIG. 8 gives the algorithm to delete a prefix p from a DTBM. The algorithm first searches for the DTBM node that contains p. During this search, the last sequence of nodes with count field equal to 1 and IBM equal to 0 together with the index of the child pointer used to move from each node in this sequence are stored in the array nodes. Whenever the search reaches a DTBM node with count larger than 0 or with a non-zero IBM field, this sequence is reset to null. In case p is found in the DTBM, it is removed from its DTBM node Z. If now the IBM of Z is 0 and Z has no children, then Z along with its contiguous ancestors with count equal to 1 and IBM equal to 0 are deleted (using the method deleteCleanup in FIG. 9).

There are three possible modes of operation for a DTBM—free, packed, and lazy. To analyze the performance of the DTBM data structure in each of these three modes, the data structure is implemented on a computer with a Cypress Full-Flex Dual-Port SRAM. The memory capacity of this SRAM is 36 Mb (512K72-bit words). The SRAM has two independent ports, both of which support read and write. A 72 bit word may be read/written via either port in 2 cycles (i.e., 8 ns using a 250 MHz clock). Multiple read/writes may, however, be pipelined and each additional word may be read/written in a single cycle (4 ns). The CPU is assumed to be sufficiently fast such that the time required for a lookup, insert and delete is dominated by the time to read/write data from/to the SRAM.

Hence the complexity of lookup, insert, and delete is analyzed by counting the (worst-case) number of memory accesses. In the SRAM, two words may be read/written in a single memory access. While the analysis and specific DTBM implementations of are very specific to the chosen SRAM, the concepts may be applied easily to any other SRAM.

Experimental Results

To assess the efficacy of the dynamic router table of the DTBM structure with two other structures—BaRT (Lunteren, J., "Searching very large routing tables in fast SRAM", Proceedings ICCCN, 2001 and Lunteren, J. "Search very large routing tables in wide embedded memory" *Proceedings Globecom*, 2001) and TBM (Eatherton, W., G. Varghese, Z. Dittia "Tree bitmap: hardware/software IP lookups with incremental updates" *ACM SIGCOMM Computer Communication Review*, 34, 2, Apr. 2004)—it was assumed that each memory accesses requires two cycles. For BaRT, versions 8888, 86558 and 844448 reported in Lunteren, J. (Lunteren, J., "Searching very large routing tables in fast SRAM", *Proceedings ICCCN*, 2001) were used for stand-alone mode and for TBM, 13-4-4-4-4-3 software reference design of Eatherton et al. (Eatherton, W., G. Varghese, Z. Dittia "Tree bitmap: hardware/software IP lookups with incremental updates" *ACM SIGCOMM Computer Communication Review*, 34, 2, Apr. 2004) was used. Although the Cypress FullFlex Dual-Port SRAM is able to pipeline memory accesses so that all but the first access takes one cycle each, none of the data structures considered was able to use this feature. Thus, the number of cycles becomes twice the number of memory accesses. Table 1 gives the worst-case number of cycles needed for a lookup and update for the considered data structures. As can be seen in Table 1, the DTBM variants have considerable better update characteristics; all are comparable on lookup cycles.

EXAMPLE 1

Free Mode Bitmap

In this mode, memory management is done using a single chain of free nodes, each node on the single chain is of the same size. A node is allocated by removing the first node on this chain and a node is deallocated by adding the deallocated node to the front of the chain. All of memory is initialized to 0 and whenever a node is deallocated, all its children fields also are 0. Consequently, the algorithms work without explicitly setting child pointers to 0 each time a node is allocated. Because of the simple memory management scheme in use, node allocation and deallocation each require a single memory access, for a total of 2 cycles.

For a word of the SRAM 72 bits in length, the largest stride that can be used yet have an IBM that fits in a word is s=6. Since the maximum length of an IPv4 prefix is 32, with a stride of 6, the DTBM has at most six levels. Several choices are possible for the strides of these six levels. Each provides a different balance between memory usage and time per operation.

In one embodiment, the described implementation, called 366666, uses a stride of 3 for the root of the DTBM and a stride of 6 for the remaining DTBM nodes. The levels are numbered 0 (root) through 5. The root of the DTBM requires a 7-bit IBM, eight child pointers, and seven nextHop fields. The stride-3 DTBM root is represented by storing its IBM in a register, and its nextHop fields in predetermined memory locations. The 8 child pointers are eliminated and instead, nodes numbered 1 through 8 are designated as the (up to)

TABLE 1

Memory requirements and the worst-case lookup and update times

| | | | Memory (Mbits) | | | | | |
|---|---|---|---|---|---|---|---|---|
| Table Size | Lookup (cycles) | Update (cycles) | Paix1 16,172 | Pb1 22,225 | MaeWest 28,889 | Aads 31,827 | Pb2 35,302 | Paix2 85,987 |
| BaRTs 8-8-8-8 | 12 | 794[a] | 4.5 | 5.3 | 7.3 | 8.5 | 9.0 | 21.5 |
| BaRTs 8-6-5-5-8 | 14 | 226[a] | 1.5 | 1.9 | 2.5 | 2.8 | 2.9 | 6.8 |
| BaRTs 8-4-4-4-4-8 | 16 | 90[a] | 1.2 | 1.6 | 2.0 | 2.3 | 2.5 | 5.3 |
| TBM 13-4-4-4-4-3 | 12 | >6000 | 1.2 | 1.5 | 1.8 | 1.9 | 2.3 | 4.2 |
| FreeMode 3-6-6-6-6-6 | 12 | 18 | 18 | 26 | 32 | 35 | 26 | 36 |
| LazyMode 3-6-6-6-6-6 | 12 | 12[b] | 18 | 26 | 32 | 34 | 26 | 36 |
| PackedMode 4-6-6-6-5-6 | 14 | 48 | 12 | 17 | 20 | 22 | 17 | 23 |
| LazyMode 4-6-6-6-5-6 | 14 | 14[b] | 12 | 16 | 19 | 21 | 16 | 21 |

[a]Excludes memory accesses for storage management.
[b]Data structure needs to be rebuilt when we get close to running out of memory.

Table 1 also gives the memory required by the different data structures for 6 publically available router tables. The databases Paix1, Pb1, MaeWest and Aads were obtained on Nov. 22, 2001, while Pb2 and Paix2 were obtained on Sep. 13, 2000 from Merit, Ipma statistics, and would now be available through, for example, well-known internet achieve services. These 6 databases ranged in size from a low of 16,172 (Paix1) rules to a high of 85,987 (Paix2) rules. Although the subject DTBM scheme takes slightly more memory than the BaRT and TBM schemes, the memory required is acceptable and within the bounds of current technology.

The following are examples that illustrate procedures for practicing the invention. These examples should not be construed as limiting.

eight children of the root of the DTBM. No count field is stored for the root as the root is never deleted.

A node requires a 63-bit IBM, 6-bit count field, 64 child pointers and 63 nextHop fields. If 18 bits are allocated to each pointer, 256K nodes can be indexed. For the 64 child pointers, 16 72-bit words are needed. For each nextHop field, 12 bits are allocated. This is sufficient for 4096 different nextHop possibilities. Hence, to accommodate all the required nextHop fields, 11 words are required. Thus, each node uses 28 words. Nodes are indexed 1, 2, and so on. By multiplying the node index by 28 and possibly adding an offset, the first word of the node can be determined. With our 18-bit pointer fields, it is possible to index up to 7M words, which is far greater than the size of the SRAM under consideration.

For a lookup, the move from level 0 (root) to level 1 requires no memory access. At level 1, the IBM as well as a child pointer of a single node is accessed. The required child pointer is determined by examining s=6 bits of the destination address. From these s bits and the knowledge of where the node starts in memory as well as the node structure, one can compute the index of the word that contains the desired child pointer. Hence, the IBM using one port of the SRAM and the child pointer using the other port may be obtained. So, a total of 2 cycles (or a single memory access) are needed to move from level 1 to level 2. In fact each subsequent move down the TDBM takes the same amount of time. In the worst-case, a lookup requires four such moves followed by a read of a level-5 IBM for a total time of 10 cycles. In the end, another memory access is needed to obtain the next hop for the longest matching prefix. Hence, the worst-case lookup time is 12 cycles (or 48 ns). Thus, almost 21 million lookups per second is predicted.

The worst-case for an insert is when the insert requires the addition of a new node at each of the levels 2 through 5. For this, four nodes must be allocated at a cost of four memory accesses or 8 cycles. Additionally, the count field must be updated and a child pointer must be set in a node at each of the levels 1 through 4 and the IBM field and a nextHop field of a level-5 node must be set. Using the dual port memory, the required two fields in each node in 2 cycles can be set. So, an insert requires 18 cycles in the worst-case.

The worst-case for a delete occurs when a prefix that is in a level-5 node and the cleanup step for this deletion is deleted. Since nodes 1 through 8 cannot be allocated because they are reserved for level 1, deallocation occurs at each of the levels 2 through 5. The desired level-5 node is reached by making four reads. When the IBM of the reached level-5 node is read, it should be verified that it becomes 0 following the prefix deletion. This requires another read. Here, four child pointers must be set to 0, and four nodes must be deallocated. The writing of a 0 pointer can be done at the same time a node is deallocated. So, a delete requires at most nine memory access or 18 cycles.

In Free Mode, most of the nodes in a TDBM are leaves and a leaf may be detected by examining its count field (which is 0). Hence a leaf does not require children fields. These fields account for 16 of the 28 words that comprise a node.

EXAMPLE 2

Packed Mode Bitmap

In an effort to improve the memory efficiency of the TDBM structure, the packed mode is one example in which several leaves may be packed into a single 28-word node. A 28-word node can be referred to as a type A node.

For the packed mode, one can consider a 466656 implementation. This implementation is motivated by the observation that, in practice, IPv4 rule tables have very few prefixes whose length is more than 24. Consequently, a 366666 DTBM is expected to have very few nodes at level 5. Hence, virtually all of the level 4 nodes are leaves. Further, very few leaves are expected at levels 2 and 3. In the 466656 design, type B nodes are used at level 5 and type C nodes at level 4.

In a 466656 TDBM, the root stride is 4, the stride at level 4 is 5, and the stride at every other level is 6. The root of the DTBM requires a 15-bit IBM, 16 child pointers, and 15 nextHop fields. As was the case for the 366666 design, the DTBM root is represented by storing its IBM in a register and its nextHop fields in predetermined memory locations. The 16 child pointers are eliminated and instead, type A nodes numbered 1 through 16 are designated as the (up to) 16 children of the root of the DTBM. The size of a type C node is 8 words. A level 4 leaf is represented using a single type C node. The first word of this node is used to store a 31-bit IBM, a 5-bit count field, an 18-bit pointer (which is null), and a 12-bit nextHop field. The next 6 words are used to store the remaining 30 nextHop fields. The last word is unused. A level-4 non-leaf uses 2 type C nodes. The first is used for a level 4 leaf except that the pointer field now points to the second type C node. The second type C node stores 32 18-bit child pointers. A type B node requires 12 words and has all the fields of a type A node other than the count field and children pointers. Notice that with 18-bit pointers, one can index only one-fourth as much memory as indexed in free mode. This is because a pointer in a type A node needs to point to type-C nodes embedded within a type A node.

Although there are three node-types, memory management is relatively simple. The available memory is partitioned into type A nodes. A type A node may be used as a type A node or may be used to house three type C nodes (CCC) leaving four words unused. A type A node may also be used to house two type C and one type B node (CCB). When used in the last two ways, first eight words are required to be used as a type C node that has an IBM, a count, and a next hop. This presents the last word in the first type C node packed into a type A node (i.e., word 8 of the type A node) free for control information. Word 8 of a 28-word node is called its control word. A child pointer always points to the first word in a type A, B or C node.

If words are indexed beginning at 0, then a child pointer can be considered to be a multiple of 4 and thus its last two bits—which always are 0—need not be stored. Using a 19-bit child pointer, it is feasible to address up to 1M words. Since a word (or bits in a word) has multiple uses (IBM, child pointer, next hop) it is essential that delete operations set all bits associated with the prefix being deleted to 0.

In one embodiment, seven free lists can be maintained, free[0:6] with the bits in the array index identifying the state of the nodes on each list. For example, free[0]=free[$000_2$] is a list of free nodes in which all 28 words are available for use and free[3]=free[$011_2$] is a list of free nodes in which the first 8 words are free, the next 8 are used as a type C node, and either the next 8 are used as a type C node or the next 12 as a type B node. Listfree[0] is a chain and the remaining lists are doubly linked. The previous pointer of the first node in each doubly linked list may be set to any arbitrary value. Three bits of the control word of a node into which type B or C nodes have been packed are used to indicate which list the node is in. These three bits are 0 in case the node is in no list and 18 bits for each of the pointers previous and next are needed for a doubly linked list.

In another embodiment, type A nodes (those needed at levels 2 and 3) may be allocated only from the list free[0]. Type C nodes that are to have an IBM are preferentially allocated from any one of the listsfree[1:6] and remaining type C nodes are preferentially allocated from the lists free [1:2] and free[4:6]. Type B nodes are preferentially allocated from any of the free lists free[$010_2$], free[$100_2$], and free [$110_2$]. In case a type B or C node cannot be allocated from one of its preferential lists, the allocation is made from free [0]. When a type B node is allocated from the list free[0], the allocated node is removed from the front of the list free[0] and put on to the list free[$001_2$] and so on. For example, suppose node X, which is at the front of free[$100_2$] is to be allocated for use as a type B node. 1 memory access is needed to remove this node from free[$100_2$] because free[$100_2$] must be reset to the next node on the list (this requires the control word of X to be read).

The control word of the new node at the front of free[$100_2$] is not read or written because its previous pointer need not be set to null. Rather, X is to be added to the front of free[$101_2$]. The next field of the control word of X is set to free[$101_2$]; and this control word is written and the control word of free[$101_2$] is read (the read and write are done in the same memory access using both memory ports). The previous pointer in the control word of free[$101_2$] is changed to X and written back to memory. So, two memory accesses are needed to add X to the front of free[$101_2$]. The worst-case memory accesses for a node allocation is three, a cost of 6 cycles. More precisely, one memory access is needed to allocate a node of type A and up to 3 to allocate a node of type B or C.

To deallocate a node from levels 2 and 3, the deallocated node is added to the front of free[0]. This has a cost of one memory access (free[0] is a chain). To deallocate any other node the start of the 28-word node must first be computed in which it is housed. For example, let x be the start of a type B or type C node. This node is housed in a type A node that begins at y=$\lfloor x/28 \rfloor$*28. The control word of the type A node that begins at y is read and the new status for this node is computed. In the worst case, this type A node will have to be moved from the middle of one doubly linked free list to the front of another. From the control word of y its current, previous and next nodes can be determined. The control words of these previous and next nodes may be read and modified to reflect the deletion of y with two memory accesses using the dual-port memory. Another up to two memory accesses are needed to add y to the front of its new free list. Thus, deallocating a node of type B or C may make up to five accesses; a node of type A may be deallocated with a single memory access.

The worst-case lookup cost in the 466656 scheme is 2 cycles more than in the 366666 scheme, because at level 4 the IBM and child pointer cannot be accessed concurrently. A type C node using a child pointer in a level 3 node must first be accessed, then using the pointer in this type C node the word in the next type C node that contains the child pointer to the desired level 5 node can be determined. Thus, the total lookup time is 14 cycles.

The worst-case for an insert is when the insert requires a new node to be added at each of the levels 2 through 5. Two type A nodes and three type B or type C nodes must be allocated. Since an allocation from free[0] can be done during the first read access of an allocation from any of the other lists, the worst-case accesses needed to allocate the needed five nodes is nine accesses. Additionally, the count field must be updated and a child pointer must be set in a node at each of the levels 1 through 3.The count and next field of a type C node at level 4 must be set, in addition to a child pointer in a level 4 type C node, the IBM field, and a nextHop field of a level 5 node. Using the dual port memory, the required fields in each of these six nodes can be set in 2 cycles. Hence, an insert requires 30 (15 memory accesses) cycles in the worst-case.

The worst-case for a delete occurs when a prefix that is in a level-5 node and the cleanup step are deleted, type A node at each of the levels 2 and 3, two type C nodes at level 4 and one type B node at level 5 are deallocated. These node deallocations have a nominal worst-case cost of 17 memory accesses (34 cycles). The worst-case cost can be reduced to 15 memory accesses by deallocating the type A nodes in slots in which the deallocation of the remaining three nodes uses only one port of the dual port memory. The desired level 5 node can be reached by making five reads. The IBM of the reached level 5 node cane be read and verified that it becomes 0 following the prefix deletion. The next step is to write out the 0 IBM, set the nextHop field for the deleted prefix to 0, and set the next pointer in a level 4 type C node to 0. This requires another two accesses. A child pointer needs to be set to null in three of the five nodes being deallocated as well as in a level-1 node. These four child pointers can be set to null with two memory accesses. The total number of memory access is 24 for a cycle count of 48.

EXAMPLE 3

Lazy Mode Bitmap

In this mode, prefix deletion is done by simply setting the appropriate bit of the IBM of the node that contains the deleted prefix to 0. The cleanup action performed by delete-Cleanup is not done. Consequently, nodes are never deallocated. While it is easy to see that lazy mode operation, through its elimination of the cleanup action, supports faster deletes, lazy mode operation also speeds inserts as memory management is simplified. Besides a reduction in the worst-case time for an insert, average-case time also may be reduced as future inserts may reuse nodes that would, otherwise, have been deallocated during the cleanup phase of a delete. In order to prevent the risk of failing to make an insert, it is preferable to rebuild the data structure whenever it gets "close" to running out of memory. The rebuild time, even for large router-tables, is of the order of tens of milliseconds.

In the lazy mode of operation, a count field (FIG. 5) is not required, as this field is used only to assist in determining which nodes are to be deallocated in the cleanup phase of delete. FIGS. 10 and 11 give the algorithms for insert and delete in the lazy mode of operation. Lazy-mode implementations of both 366666 and 466656 DTBMs were evaluated.

For 366666, nodes of type A for levels 1 through 4 and of type B for level 5 were used. The root of the DTBM is stored as for the non-lazy implementation; type A nodes numbered 1 through 8 are used for the (up to) eight children of the root of the DTBM.

Although a count field is not used in this mode, the size of type A and type B nodes is unchanged. That is, a type A node is 28 words long and a type B node is 12 words. As nodes are never deallocated in the lazy mode of operation and as a type A node never becomes a type B node (or the reverse) as the result of an insert or delete, a fairly simple memory management scheme may be used. The memory to be managed is a block of contiguous words. All bits in this block are initialized to zero. Type A nodes are allocated from one end of this block and type B nodes from the other end. When a node is allocated, it is assigned an index. Type A nodes are indexed 1, 2, 3 and so on. Type B nodes are indexed in the same way. A child pointer in a type A node stores the index of the node to which it points. When navigating through the DTBM, the node type is inferred from the level it is currently at and the first word in the node is obtained by multiplying the node index by its size (28 or 12) and adding or subtracting the result to/from a base address. Since each node is at least 12 words long, fewer than 44K nodes are possible in the SRAM.

The lookup time is the same, 12 cycles, as that for a non-lazy 366666 DTM. The worst-case for an insert is when the new prefix goes into either a new or existing level 5 node. Considering the former case, such an insert requires one to read a pointer field from one node at each of the levels 1 through 4 (alternatively, at each level where there is no node to read, a new node is created and a pointer written to the parent node), write a pointer field of a level 4 node, and write a new level 5 node. The write of the level 5 node is done by writing the word that contains its IBM plus the word that has the nextHop value for the inserted prefix. The remaining words are unchanged (all bits were set to 0 initially). Both words of the level 5 node that are to be written may be written in parallel using the 2-ported memory. So, a worst-case insert requires four reads from and two writes to the 2-ported memory for a total time of 12 cycles.

The worst-case for a delete occurs when a prefix that is in a level 5 node is deleted. The desired level 5 node can be reached by making four reads. Next, a bit of the IBM of the reached level 5 node must be set to 0. To make this change, the old IBM must be read, changed, and that change must be written back to memory. This requires an additional read and write access. So, five read and one write accesses are needed for a total of 12 cycles. Interestingly, all three of the operations have the same worst-case requirement of 12 cycles.

The root of a lazy-mode 466656 DTBM is represented as for its non-lazy counterpart and type A nodes are numbered 1 through 16 as the (up to) 16 children of the root of the DTBM. Type A nodes are used at levels 1, 2, and 3 and type C nodes at levels 4 and 5. The size of a type C node is 8 words. At level 5, two adjacent type C nodes are used for each DTBM node. Since the nodes are adjacent, no pointer is needed from the first node to the second. This use of two type C nodes wastes four words per DTBM level 5 node. However, since very few nodes are expected at this level, the total waste is expected to be small. Since the lazy-mode 466656 design uses only two node sizes, the same memory management scheme may be used as the lazy-mode 366666 scheme. The worst-case lookup cost in the 466656 scheme is the same, 14 cycles, as for the non-lazy mode.

The worst-case for an insert is when a prefix is inserted into an existing level 5 node. It takes 10 cycles to get to this level 5 node, 2 cycles to read this level-5 node's IBM, and another 2 cycles to write the modified IBM as well as the next hop associated with the inserted prefix. The total insert time is 14 cycles.

A worst-case delete is one that deletes a prefix from a level 5 node. As for a worst-case insert, it takes 10 cycles to get to this level 5 node, 2 cycles to read its IBM and another 2 cycles to write the changed IBM. The total time again is 14 cycles. Although the lazy-mode 466656 design takes 2 cycles more per operation than does the lazy-mode 366666 design, the 466656 design is expected to require less memory to represent real-world IPv4 router tables.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, programmable logic device, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, including programmable logic devices, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention. User input may be received from the keyboard, mouse, pen, voice, touch screen, or any other means by which a human can input data into a computer, including through other programs such as application programs.

All patents, patent applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A method for inserting a prefix using a dynamic treebitmap (DTBM) data structure whose stride is s, said DTBM including a prefix bitmap for representing a sub-trie, a next hop array, an array of child pointers, and a count of the number of non-null children, wherein the prefix bitmap, the next hop array, the array of child pointers, and the count of the number of non-null children represent a node of the sub-trie, wherein each node stores an internal bitmap (IBM), the method comprising: walking through the DTBM one node at a time to find an appropriate node to insert the prefix, where the walk consumes s bits of the prefix;
   if during the walk the prefix has fewer than s bits left, the remaining bits of the prefix less than s bits are used to insert the prefix into the last node encountered; and
   if an appropriate node does not exist, new nodes are added to the DTBM until fewer than s bits are left in the prefix, where the remaining bits of the prefix less than s bits are used to insert the prefix into the last node encountered.

2. A method for deleting a prefix using a dynamic treebitmap (DTBM) data structure including a prefix bitmap for representing a sub-trie, a next hop array, an array of child pointers, and a count of the number of non-null children, wherein the prefix bitmap, the next hop array, the array of child pointers, and the count of the number of non-null children represent a node of the sub-trie, wherein each node stores an internal bitmap (IBM), the method comprising:
   searching the DTBM for a node that contains the prefix; and
   if the prefix is found in the DTBM, the prefix is removed from the node,
   wherein if the IBM of the node is zero and the node has no children, then the node along with its continuous ancestors with count equal to 1 and IBM equal to zero are deleted.

3. A method for memory management using a dynamic treebitmap (DTBM) data structure including a prefix bitmap for representing a sub-trie, a next hop array, an array of child pointers, and a count of the number of non-null children, wherein the prefix bitmap, the next hop array, the array of child pointers, and the count of the number of non-null children represent a node of the sub-trie, wherein each node stores an internal bitmap (IBM), the method comprising:
   using a single chain of free nodes, where each node on the single chain is of the same size;
   allocating a node by removing the first node on a chain; and
   deallocating a node by adding the deallocated node to the front of a chain, where all memory is initialized to zero and whenever a node is deallocated, all of its children fields are zero.

4. The method of claim 3, wherein the DTBM has a stride of 3 for the root of the DTBM and a stride of 6 for the remaining DTBM nodes and the levels are numbered zero at the root through 5.

5. The method of claim 4, wherein the root of the DTBM has 7-bit IBM, eight child pointers, and seven nextHop fields.

6. The method of claim 5, further comprising the step of representing the DTBM root by storing its IBM in a register and its nextHop fields in predetermined memory locations.

7. The method of claim 3, further comprising the steps of lookup for the longest matching prefix, insert of a new prefix, and deletion of a prefix.

8. A method for memory management using a dynamic treebitmap (DTBM) data structure including a prefix bitmap for representing a sub-trie, a next hop array, an array of child pointers, and a count of the number of non-null children, wherein the prefix bitmap, the next hop array, the array of child pointers, and the count of the number of non-null children represent a node of the sub-trie, wherein each node is a 28-word node and packs several leaves, the method comprising:

designating the 28-word nodes as the root of the DTBM; and representing the DTBM root by storing its IBM in a register and its nextHop fields in predetermined memory locations, wherein the 28-word node is a type A node and may be partitioned into type B nodes and type C nodes.

9. The method of claim 8, wherein the DTBM has a stride of 4 for the root of the DTBM and a stride of 6 for the remaining DTBM nodes.

10. The method of claim 8, wherein the type A nodes are designated as the children of the root of the DTBM.

11. The method of claim 8, further comprising the steps of identifying free nodes in which all 28 words are available for use and maintaining the free nodes in a list.

12. The method of claim 11, wherein a first list is a chain and the remaining lists are doubly linked, where bits of a control word of a nock are used to inidicate which list a node is in.

13. The Method of claim 12, wherein nodes are allocated from the first list chain.

14. The method of claim 8, further comprising the steps of lookup for the longest matching prefix, insert of a new prefix, and deletion of a prefix.

* * * * *

UNITED STATES PATENT AND TRADEMARK OFFICE
CERTIFICATE OF CORRECTION

PATENT NO. : 8,284,787 B2
APPLICATION NO. : 12/307064
DATED : October 9, 2012
INVENTOR(S) : Sartaj Kumar Sahni et al.

It is certified that error appears in the above-identified patent and that said Letters Patent is hereby corrected as shown below:

Column 10,
Line 41, "Listfree[0]" should read --List free[0]--.
Line 52, "listsfree[l:6]" should read --lists free[l:6]--.

Column 16,
Line 16, "control word of a nock" should read --control word of a node--.

Signed and Sealed this
Twenty-second Day of January, 2013

David J. Kappos
*Director of the United States Patent and Trademark Office*